Oct. 13, 1964 J. E. BURBANK 3,152,433
METHOD AND APPARATUS FOR MAKING PLASTIC
FILAMENT COILS FOR ZIPPER FASTENERS
Filed Dec. 7, 1962 6 Sheets-Sheet 1

INVENTOR
John E. Burbank
BY
H. F. Johnston
ATTORNEY

Oct. 13, 1964     J. E. BURBANK     3,152,433
METHOD AND APPARATUS FOR MAKING PLASTIC
FILAMENT COILS FOR ZIPPER FASTENERS

Filed Dec. 7, 1962     6 Sheets-Sheet 3

INVENTOR
John E. Burbank
BY
H. J. Johnston
ATTORNEY

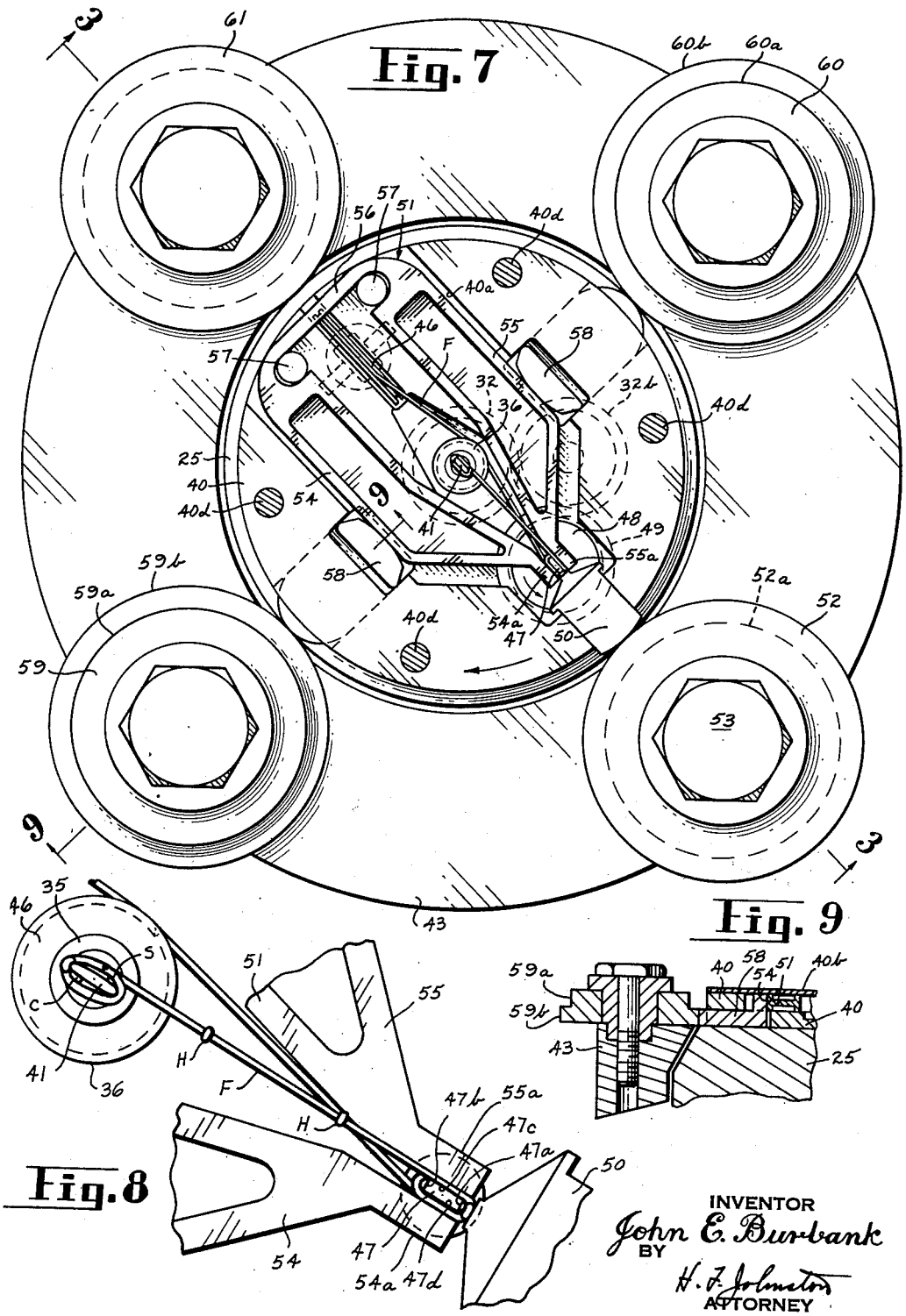

Oct. 13, 1964
J. E. BURBANK
3,152,433
METHOD AND APPARATUS FOR MAKING PLASTIC
FILAMENT COILS FOR ZIPPER FASTENERS
Filed Dec. 7, 1962
6 Sheets-Sheet 5
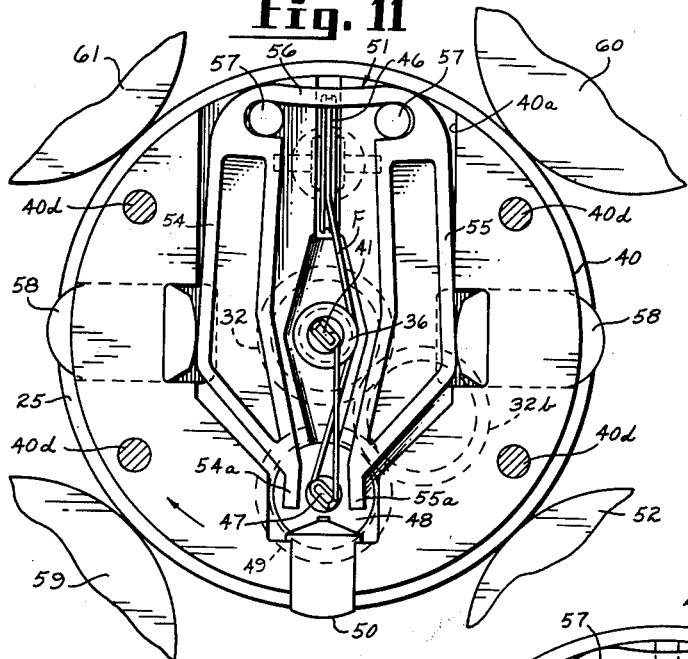
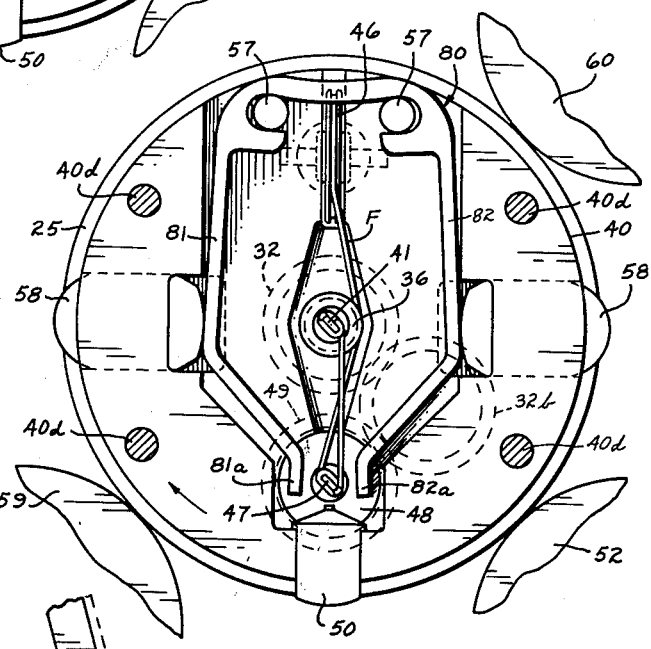
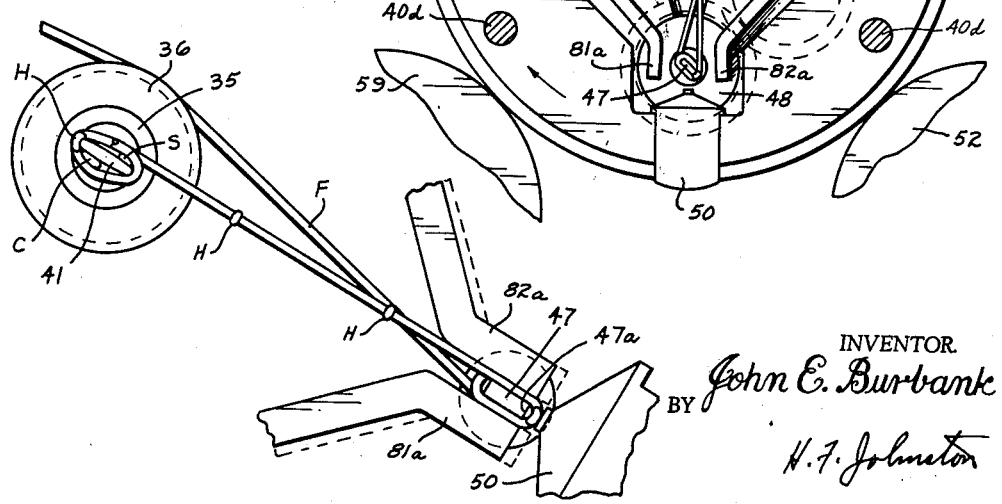
INVENTOR.
John E. Burbank
H. F. Johnston
BY

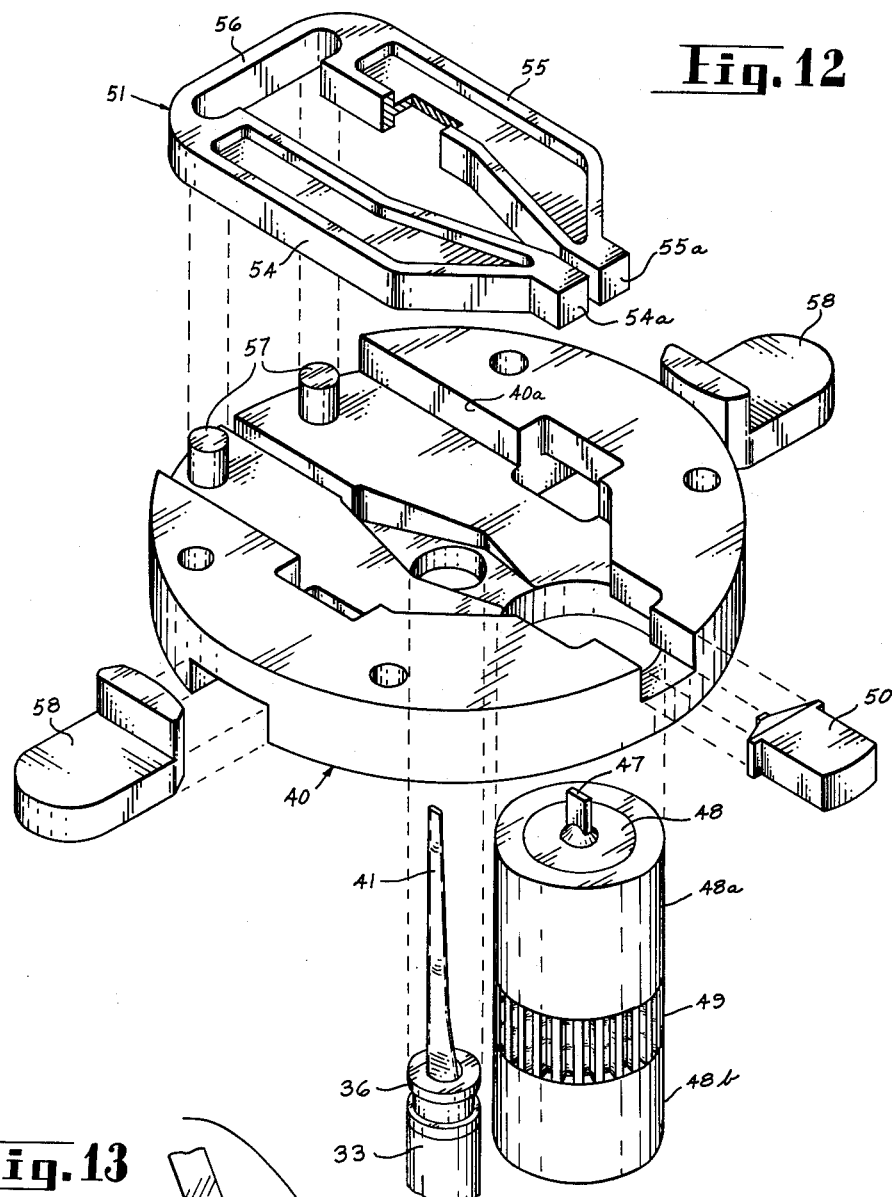
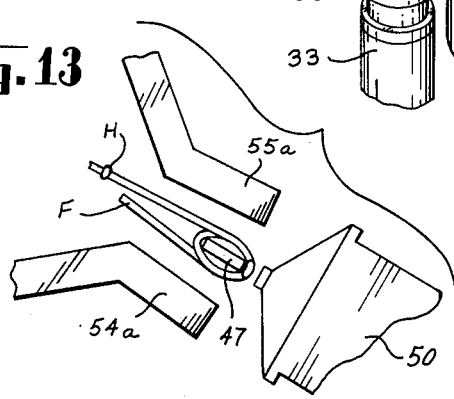

United States Patent Office 3,152,433
Patented Oct. 13, 1964

3,152,433
METHOD AND APPARATUS FOR MAKING PLASTIC FILAMENT COILS FOR ZIPPER FASTENERS
John E. Burbank, Middlebury, Conn., assignor to Scovill Manufacturing Company, Waterbury, Conn., a corporation of Connecticut
Filed Dec. 7, 1962, Ser. No. 243,130
11 Claims. (Cl. 57—18)

This invention relates to the manufacture of zipper fastener components of the type consisting of a plastic filament coil with a row of deformations or heads for interlocking with a similar coil. Preferably, one or more inelastic strands or cords are introduced into the coil while it is being made.

One of the objects of the invention is to provide a coil of this type in which the convolutions are uniformly arranged and spaced until they can be permanently set as by the use of heat. To this end, the invention utilizes tension of the inelastic cord or cords for removing the coil from the mandrel on which it is wound.

Another object of the invention is to provide an improved process and apparatus for forming a coil of the kind described, wherein not only the heads are preformed on a bent portion of the filament before coming to the winding mandrel, but also, the filament is given a preset coil-like condition so that it more easily assumes the desired final shape of the coil when wrapped around the winding mandrel and cord or cords even though the winding mandrel is not normally of a proper shape on which to form the coil. The invention is particularly advantageous when the filament material is nylon or some plastic having similar properties, because of the "memory" characteristic of such material. Thus, when the filament is pressed firmly into coil shape, then temporarily straightened, it will tend to assume again the shape into which it had recently been pressed when it comes on the winding mandrel.

Another object of the invention is to produce an apparatus for making such a coil which is capable of continuous operation at high speeds and at the same time, which is economical to produce.

In the accompanying drawings, I have shown for the purpose of illustration, one embodiment which the invention may assume in practice. In these drawings:

FIG. 7 is a top plan view of the coiler itself, with the cover plate removed and showing the clamping tool in closed position;

FIG. 8 is also a plan view of a portion of FIG. 7 on an enlarged scale;

FIG. 9 is a detailed cross-section on line 9—9 of FIG. 7;

FIG. 11 is similar to FIG. 7 showing the head rotated about 45° from FIG. 7;

FIG. 12 is an exploded perspective of the face plate and associated parts;

FIG. 13 is a view similar to FIG. 8 showing the shape of the coil on the mandrel just prior to the clamping operation;

FIG. 14 is a view similar to FIG. 11, but showing a modified form of the clamping tool; and, FIG. 15 is an enlarged view of one end of the modified clamping tool as it appears in closed position.

Figure 1:
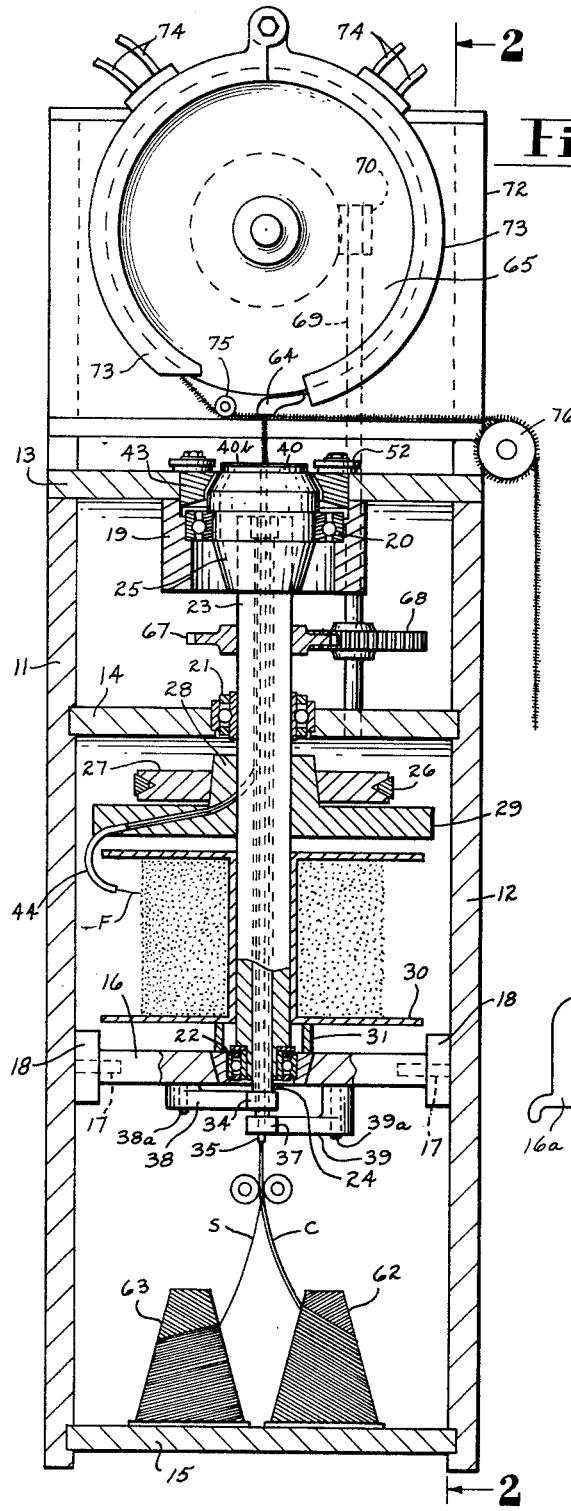
FIG. 1 is a vertical central section through the complete apparatus for making coils.

The frame of the machine includes upright walls 11 and 12, a top wall or plate 13, an intermediate plate 14 and a bottom wall or plate 15. There is also a further supporting plate 16 which is hinged on pins 17 mounted in bosses 18 so that it can be swung downwardly for a purpose which will be explained later. When in the horizontal supporting position, the plate 16 is held up by any suitable catch on the edge of the plate opposite the hinge pin 17.

Figure 3:
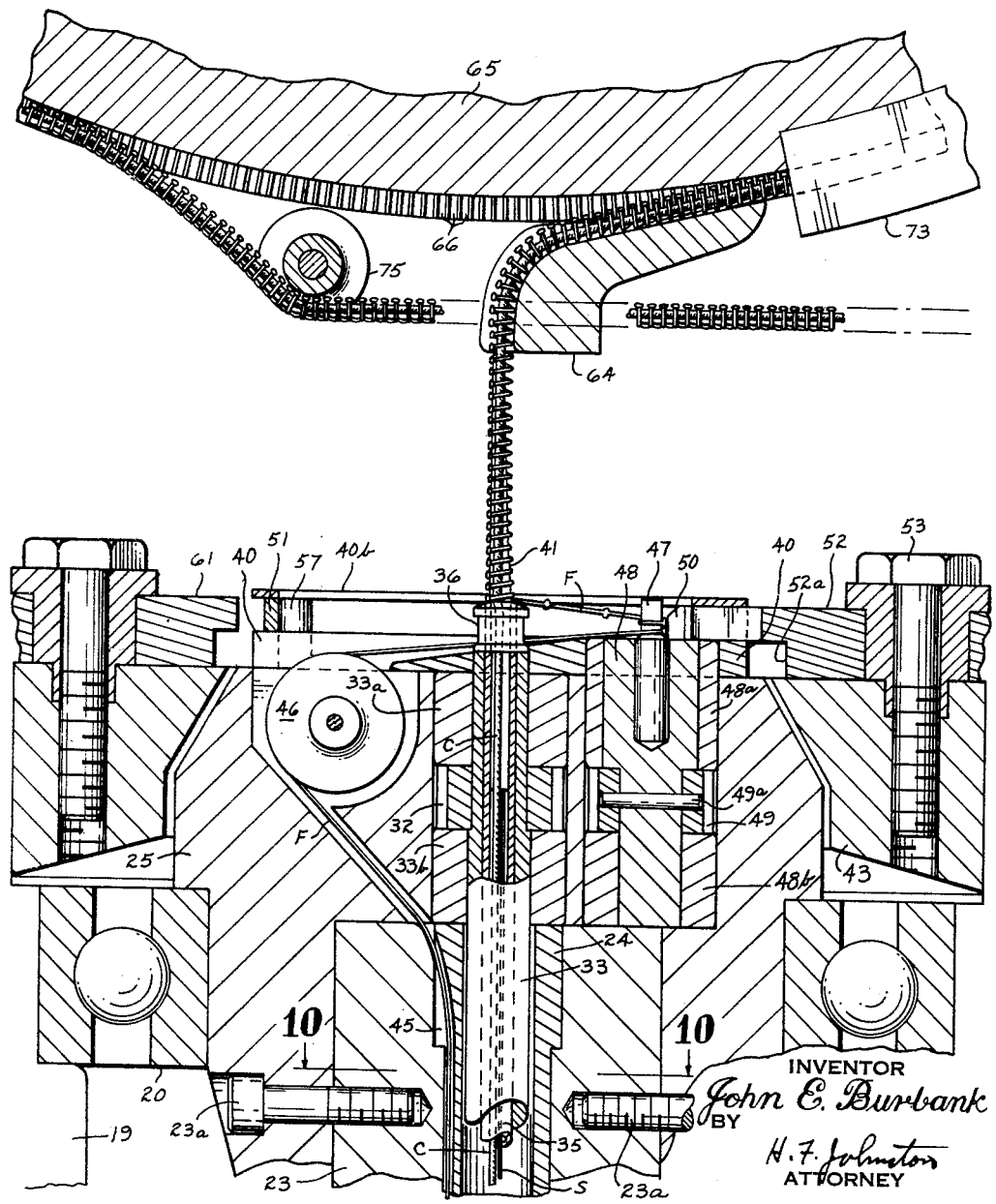
FIG. 3 is a central section on an enlarged scale of the upper part of the apparatus on line 3—3 of FIG. 7.

Rigidly attached to the top plate 13 by any suitable means is a bearing block 19 carrying a ball bearing 20. There is also a bearing 21 in the intermediate plate, and a bearing 22 in the hinged supporting plate 16, which bearings support a hollow rotating drive shaft 23. As seen in FIG. 3, the shaft 23 has its upper end firmly attached as by screws 23a to the rotating carriage 25 which is surrounded and supported by the bearing 20. A long hollow bushing 24 is tightly fitted inside and rotates with the hollow shaft 23. The bushing 24 is provided with a longitudinal groove in its outer surface so that a filament passageway 45 is provided between the bushing and the inside diameter of the hollow shaft 23. The vertical hollow shaft 23 is driven from any suitable source of power by a belt 26 and a pulley 27 attached to the hub 28 of a disc 29 which is keyed to the hollow shaft 23. A reel 30 for supplying the filament F is mounted around the hollow shaft 23 and is free to rotate on the same axis independently of the shaft while being supported on an annular bearing block 31.

A stationary hollow tube 33 has its upper end confined in spaced upper and lower bushings 33a and 33b, mounted in and turning with the carriage 25, and the tube 33 extends downwardly through the long bushing 24 beyond the end of the hollow shaft 23; and mounted on the bottom end of this tube 33, there is a collar 34. Fixed to the upper end of the hollow tube 33 is a stationary gear 32 around which the carriage 25 rotates— the gear and the tube being supported by the lower bushing 33b. Within the hollow tube 33, there is a second stationary hollow tube 35 which carries at its upper end a fixed head 36 by which it is supported on the upper end of the stationary tube 33. This smaller tube carries at its lower end a collar 37. The collars 34 and 37 are normally held against rotation by lateral brackets 38 and 39, respectively, which may be secured to the underside of the hinged plate 16 as by pins 38a and 39a.

Figure 4:
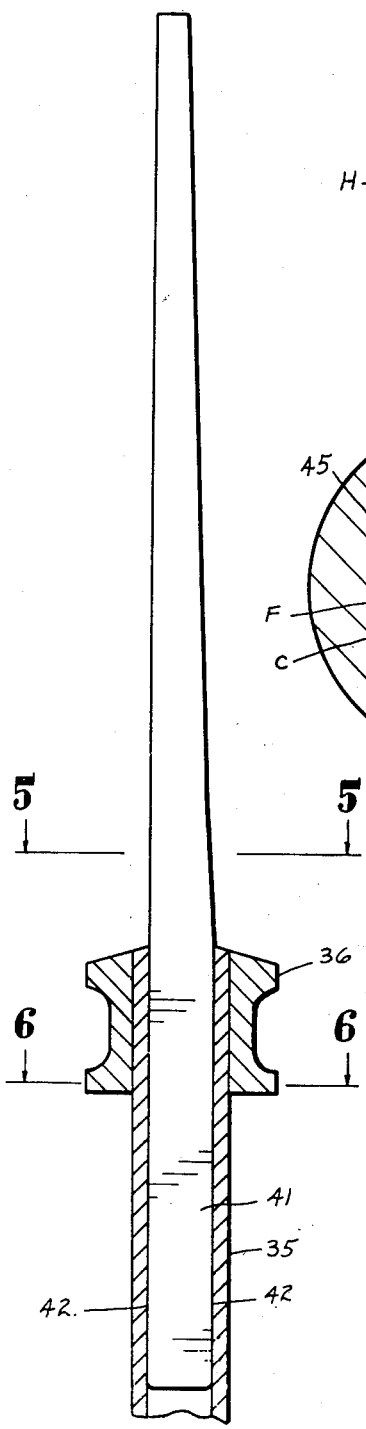
FIG. 4 is a detail of the stationary mandrel and its mounting.

Referring now to FIG. 4, the inner tube 35 serves as the mounting for a fixed mandrel 41. The lower attached end of the mandrel 41 is of rectangular cross-section and is driven tightly into the tube 35 so that its opposite edges 42 bite into the material of the tube. The mandrel 41 tapers somewhat toward its free unsupported end to facilitate the movement of the coiled filament therealong.

The filament F is lead from the reel 30 through a guide tube 44 carried by the rotating disc 29 which is fixed to the vertical shaft 23, then through a hole in the disc 29 to the passageway 45, then to an idler pulley 46 which is mounted in the carriage 25. Pulley 46 turns on its own horizontal axis and also travels in an orbit around the axis of the drive shaft 23. From pulley 46, the filament F is led to one side of the fixed head 36 and passes around the mandrel-like die 47.

As best seen in FIG. 8, the die 47 is of generally rectangular cross-section with a forward working edge 47a, a rearward working edge 47b, and flat sides 47c and 47d. The die 47 is fixed in a tool holder 48, journaled in upper and lower bushings 48a and 48b mounted in carriage 25, and extends upwardly into an opening in the face plate 40 capping said carriage 25. The face plate 40 is fastened to the carriage by bolts 40d, so that in effect, it is part of the carriage. A gear 49 is keyed to the tool holder 48 as by cross-pin 49a and is driven from the stationary gear 32 by means of an idler gear 32b shown in dotted lines in FIGS. 7 and 11. The die 47 turns on its own axis which is parallel to the drive shaft axis, while at the same time, turning bodily in an orbit around the drive shaft axis. The gear ratio of gears 49 and 32 is 1:1. By reason of the above planetary gear arrangement, as the die 47 is rotated about the mandrel 41, the various planar positions of the die will always be parallel to one another; or in other words, in the same relative parallel position to the fixed mandrel 41, regardlss of its orbital path thereabout.

A head-forming tool 50 is slidably mounted on the top of carriage 25 in a suitable guideway in the top of the face plate 40, and said tool is positioned outwardly of and in radial alignment with the die 47. This tool is normally urged radially outwardly by centrifugal force as the carriage 25 rotates. When the forming tool 50 passes a roller cam 52, it is pushed inwardly so as to deform or flatten that portion of the filament F which is opposite said forming tool. The timing is such that the head deforming is done against the front working edge 47a of the die 47. The cam 52 can be merely a circular disc rotating around bushing 53a, the latter held in place by a bolt 53 screwed into a support ring 43 mounted in the top wall 13. The cam 52, along its lower edge, has an undercut or step 52a so that the upper edge only of the cam will engage the head-forming tool 50, and the lower undercut edge is to clear other tools to be described later.

In winding the filament F around die 47, and due to the inherent resiliency of said filament, the wound filament coil will assume the shape of an ellipse (FIG. 13) with its longer legs spaced away from the flat sides 47c and 47d of said die. In order to compress the longer legs of the filament coil against the flat sides of eaid die, thereby forcing more of the filament stock outwardly from the opposite working edges 47a and 47b of said die, provision is made for a lateral clamping or flattening tool, generally indicated by the numeral 51, which operates in a recess 40a in face plate 40 (see FIGS. 7 and 12). By thus clamping the filament stock in each turn of the coil against the flat sides of the die, more stock can be crowded forwardly to form the heads in each turn of the coil as seen in FIG. 13. Of course, these tools also tend to give a preset to the filament so that it will more naturally assume the proper shape on the winding mandrel. The lateral clamping tool 51 consists of a pair of long rigid arms 54 and 55 joined at one end by a connecting bar 56 having some degree of resiliency. The tool 51 is mounted to have a small amount of lateral floating action, but no longitudinal movement in the direction of the die 47, by means of a pair of pivot pins 57 projecting from the face plate 40. The opposite end of the arms taper inwardly towards each other and terminate in clamping heads 54a and 55a, positioned on diametrically opposite sides of the die 47.

In order to operate the arms 54 and 55 of the clamping tool 51, a pair of pusher slides 58 are diametrically mounted in suitable guideways in the bottom of the face plate 40 at right angles to the head-forming tool 50 and are adapted to engage the outer edge of said arms. These pusher slides 58 have broadly curved or flat front surfaces and are operated inwardly by cams 59 and 60, respectively. These cams are similar to cam 52 except as seen in FIG. 9, the steps 59a and 60a are cut into the upper surface, leaving the edges 59b and 60b on each cam to engage and operate the pusher slides 58. This arrangement permits head-forming tool 50 to pass by cams 59 and 60, and the pusher slides 58 to pass by cam 52 without interference.

The die 47, by reason of its planetary gear system (gears 32, 32b and 49), will always assume a substantially parallel relationship to the fixed mandrel 41, and in its orbital travel around said mandrel, it will twice arrange itself in parallel relationship to the clamping heads 54a and 55a of the clamping tool 51—once when said die with its head-forming tool 50 is in line with the cam 52 as seen in FIG. 7, and again when said die and cam are diametrically opposite therefrom. The tools, such as the head-forming tool 50 and the lateral clamping tool 51 carried by the face plate 40, may be held in place by a cover plate 40b (see FIG. 3).

If desired, a fourth cam 61 may be mounted opposite the cam 52 for again operating on tool 50 to produce a second deformation in the coil against the rearward die edge 47b, but the cam 61 is designed so that the rearward deformations are not so pronounced as the heads H.

Figure 2:
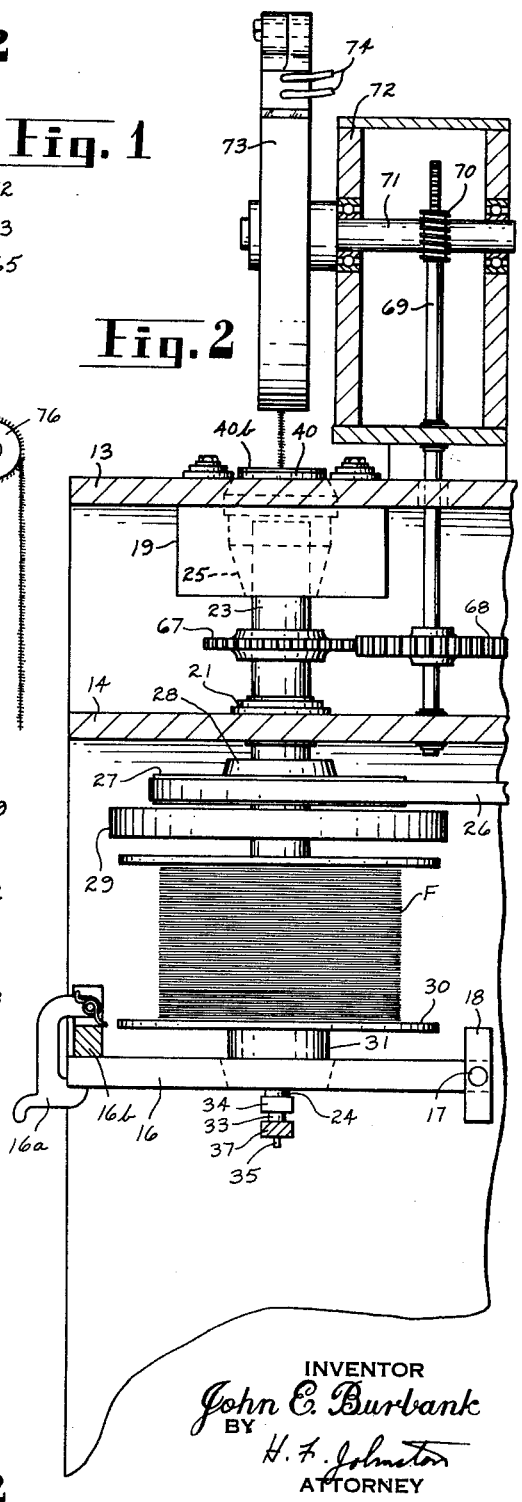
FIG. 2 is a vertical section on line 2—2 of FIG. 1.

As pointed out above, the plate 16 is mounted on hinge pin 17, which is for the purpose of removing the supply spool 30 when exhausted by hinging the plate downwardly to a vertical position and then inserting a filled spool and returning the plate to a horizontal position where it may be held in a latched position by means of a spring-tensioned latch 16a mounted on a cross bar (see FIG. 2).

The structure of the coiler per se, having been described, its operation will now be explained:

The filament supply spool 30, its guideway 45 and idler pulley 46 all rotate as a unit around the central axis of the main shaft 23, except that the supply spool may rotate slightly relative to said shaft as the filament is unwound. The filament F may take one or more turns around the die 47, and since the die 47 turns on its own axis as it orbits about the stationary mandrel 41, the filament F will be pulled from the supply spool 30. The die 47 is of rectangular cross-section and at the proper time, the arms 54 and 55 of the clamping tool 51 are moved inwardly to clamp the coiled filament against the sides of said die, and at about the same time the forming tool 50 comes into form a head in co-operation with the edge 47a of the die 47. The filament F with its preformed heads H, is then lead off the die 47 to be wound around the stationary mandrel 41. Thus, the heads H come to be all aligned along one edge of the mandrel 41.

During the process, it will be understood that the filament F is put in what may be called a preset coil condition when first wound about the die 47 so that it more readily assumes the finished coil condition when transferred from die 47 to the stationary mandrel 41. In the case in question, the coil is an oblong or flattened coil and this condition has also been preset to an extent by the lateral clamping tool 51. During the forming and coiling operation, some heat may be applied if desired, but with my improved process, this is not necessary and all heat may be applied for permanently setting the coils in the take-off or feed drum.

According to my invention, the flattened plastic filament coil surrounds at least one, and preferably two, strands of inelastic material. While either or both may be called strands or cords, I prefer to employ one relatively large cord C coming from a suitable source of supply as indicated by the numeral 62, and a smaller strand which is indicated as S, comes from a source of supply 63 at the bottom of the machine.

Figure 5:
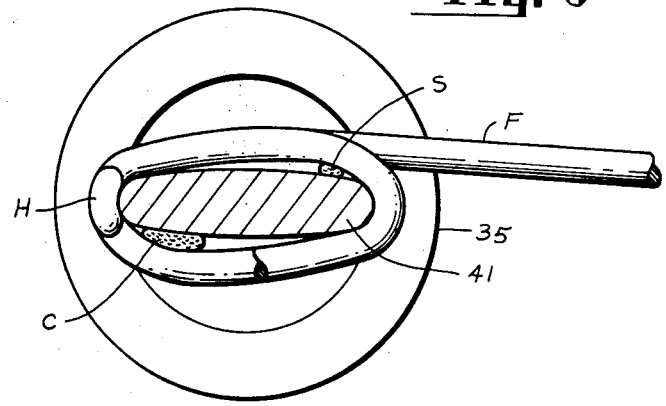
FIG. 5 is an enlarged cross-section of the mandrel on line 5—5 of FIG. 4 showing the filament wound thereabout.
Figure 10:
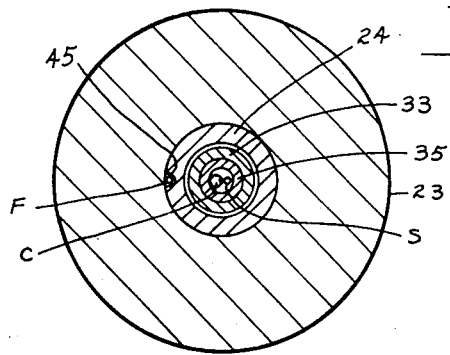
FIG. 10 is a cross-section on line 10—10 of FIG. 3.
Figure 6:
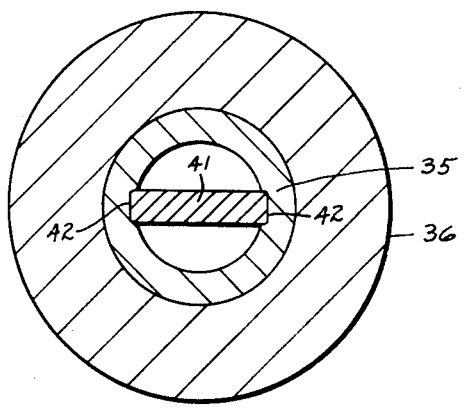
FIG. 6 is a cross-section on an enlarged scale on line 6—6 of FIG. 4.

Cord C and strand S are guided on opposite sides of the mandrel 41 after passing through the stationary inner tube 35. As these emerge from the upper end of the tube 35, they are gripped tightly against the opposite sides of the mandrel 41 due to the tension of the filament F. They thus serve as draft members or spacers to maintain the uniform condition and spacing of the coil convolutions. As seen in FIG. 5, the cord C will tend to move toward one edge of the mandrel, while the strand S moves towards the other edge on the opposite side, thus ensuring good alignment of each convolution of the flattened coil.

In this condition, the cord-enclosing coil passes through a suitable guide 64 which directs it to the periphery of a drum 65. This drum has recesses 66 spaced and shaped like the desired finished portions of the coil which they receive, including the heads H. During the operation of the machine, this drum is continuously slowly rotated so as to feed the coil off the mandrel at a predetermined rate to give the exact desired pitch. This drum rotation is accomplished from the main shaft 23 by gearing 67 and 67, vertical shaft 69 and worm gearing 70 to the shaft 71 which carries the drum 65. Shaft 71 can be supported in suitable bearings by a supplemental frame as indicated generally by the numeral 72, and the latter can be attached to the top plate 13 in a suitable way.

The drum 65 is surrounded throughout most of its circumference by a shoe 73 which is electrically heated by inner resistance coils through connections indicated at 74. The drum is of such size as to give the desired cure or heat for the necessary time interval to set the plastic coil permanently to the desired shape. This time interval can readily be determined experimentally for any given type of plastic material. After coming around the drum and passing by the heated shoe 73, the finished coil is pulled from the drum by an idler 75 from which it is directed to a receiving bin over a second pulley 76.

In FIGS. 14 and 15, I have shown a modified lateral clamping tool 80 that is intended to push more of the filament stock F in front of the head-forming side 47a of die 47. This tool 80 differs from the first form of clamping tool 51 in that its arms 81 and 82 are made to be somewhat resilient. The tool 80 is held against longitudinal movement by the pivot pin 57 and allowed a small amount of lateral floating action similar to tool 51. However, in this modified construction, when the pusher slides 58 are moved inwardly by the cams 59 and 60 to a position where the clamping heads 81a and 82a clamp the filament F against the flat sides 47c and 47d of die 47, further inward movement of said pusher slides will cause the arms 81 and 82 to bend, and by reason of their angular formation, the clamping heads 81a and 82a will move toward the forming tool to the position as shown in dotted outline in FIG. 13. Due to the fact that the heads 81a and 82a have a clamping grip on the filament stock F during their forward movement, they will consequently force more of the filament stock in front of the head-forming edge of the die 47 and thus allow more of the stock to be embodied in the heads of the coiled units during the heading operation.

Two forms of the invention are presented herein for the purpose of exemplification, but it will be appreciated that the invention is susceptible of other structurally modified forms coming equally within the scope of the appended claims.

What I claim is:

1. Process of producing a cord-enclosing plastic filament coil comprising
    (a) introducing a cord lengthwise along a mandrel;
    (b) winding a plastic filament around said mandrel and cord while maintaining sufficient tension on the filament to grip the cord firmly between the filament and said mandrel; and
    (c) pulling the coil from the mandrel by tension applied primarily to said cord whereby the positioning and pitch of the coil is kept uniform while it is being removed from the mandrel.

2. Process of producing a cord-enclosing plastic filament coil comprising
    (a) feeding two relatively inelastic strands one along each of the broader sides of a mandrel of generally rectangular cross-section;
    (b) winding a plastic filament around said mandrel and strands while maintaining sufficient tension on the filament to produce a firm grip of the filament on said strands; and,
    (c) pulling the coil from the mandrel by tension applied to said strands, whereby the positioning and pitch of the coil is kept uniform while it is being removed from the mandrel.

3. The process defined by claim 1 wherein the pulling of the coil from the mandrel is accomplished by a revolving heated drum having recesses spaced to receive the coil convolutions.

4. The process of making a plastic filament coil which comprises
    (a) winding a continuous plastic filament around a mandrel-like die to preset a coil-like condition in the filament;
    (b) continuously unwinding the filament from said die;
    (c) immediately thereafter winding said filament on a second mandrel while feeding the coil from the end of said second mandrel at a sufficient rate to provide the desired pitch of coil, and
    (d) deforming the filament at each turn on said die to provide uniformly spaced heads in the filament prior to its being wound on said second mandrel.

5. The process as defined in claim 4 wherein during the forming of each of said heads, there is also included the step of flattening portions of the filament against opposite sides of said die.

6. Apparatus for making a plastic filament coil comprising
    (a) a stationary mandrel;
    (b) a carriage mounted for rotation about said mandrel;
    (c) forming tools on said carriage traveling in an orbital path around said mandrel;
    (d) means for directing a filament to said forming tools and thence around said mandrel; and
    (e) means for operating said forming tools at each revolution of said carriage to produce a deformation of the filament for each turn around said mandrel.

7. Apparatus for making a plastic filament coil comprising
    (a) a stationary mandrel;
    (b) a carriage mounted for rotation about said mandrel;
    (c) a mandrel-like die supported in said carriage to move in an orbital path around said stationary mandrel;
    (d) means for turning said die on its own longitudinal axis one revolution for each of its orbits;
    (e) a forming tool on the carriage adjacent said die; and
    (f) means for operating said tool toward said die to produce a deformation of the filament on said die for each orbit of the die.

8. Apparatus as defined in claim 7 wherein said means for turning the die on its own axis comprises a stationary gear mounted on the same axis as said mandrel and a 1:1 ratio traveling gear connected with said stationary gear by an idler gear, and wherein said die is connected to said traveling gear.

9. Apparatus as defined in claim 7 wherein said means for operating the forming tool comprises a stationary cam alongside the carriage in the path of said tool for moving said tool toward said die.

10. Apparatus as defined in claim 9 wherein the forming die is of generally rectangular cross-section, and having in combination therewith a flattening tool to flatten a portion of the coil against one of the wider sides of said die, and means for operating said flattening tool inwardly toward the die at each operation of said forming tool.

11. Apparatus as defined in claim 9 wherein the forming die is of generally rectangular cross-section, and having in combination therewith a flattening tool to flatten a portion of the coil against one of the wider sides of said die, and means for causing said flattening tool to move slightly toward said forming tool while it is acting against said filament to crowd the material of said filament toward said forming tool.

References Cited in the file of this patent

UNITED STATES PATENTS

| 2,467,227 | Potter et al. | Apr. 12, 1949 |
| 2,475,019 | Faris | July 5, 1949 |
| 2,575,747 | Cook | Nov. 20, 1951 |
| 2,931,162 | Klein | Apr. 5, 1960 |
| 3,035,307 | Yoshida | May 22, 1962 |
| 3,054,149 | Streicher | Sept. 18, 1962 |

FOREIGN PATENTS

| 1,121,311 | Germany | Jan. 4, 1962 |
| 1,126,593 | Germany | Mar. 29, 1962 |